Jan. 19, 1965 T. H. LENNOX 3,166,006
ELECTRIC BROILER
Filed Oct. 29, 1962 2 Sheets-Sheet 1
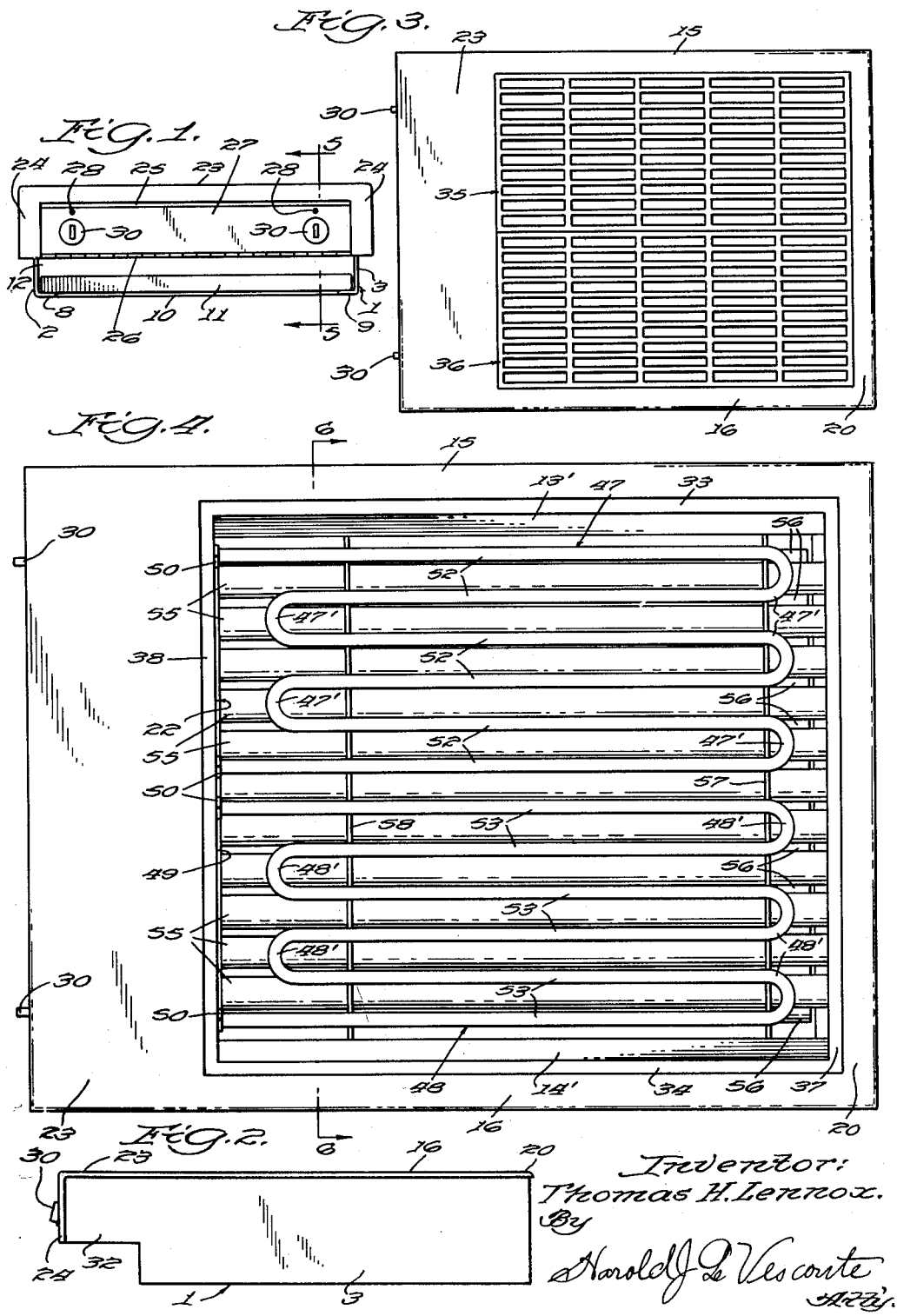
Inventor:
Thomas H. Lennox.
By
Harold J. Le Vescorte
Atty.

Jan. 19, 1965  T. H. LENNOX  3,166,006
ELECTRIC BROILER
Filed Oct. 29, 1962  2 Sheets-Sheet 2
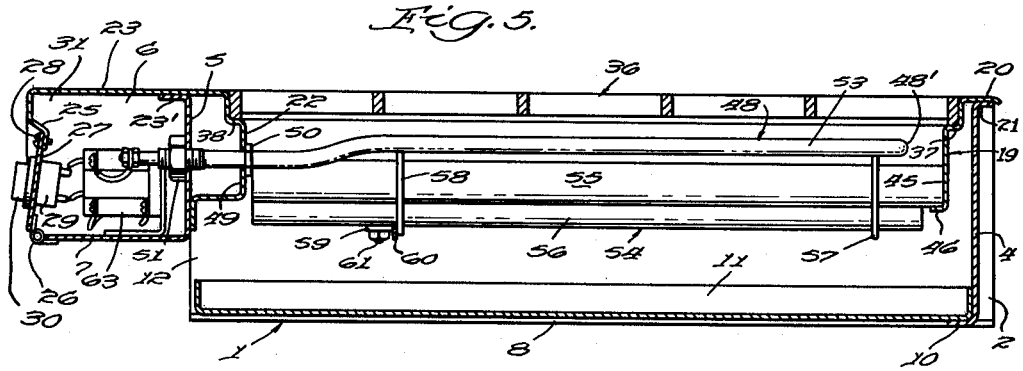
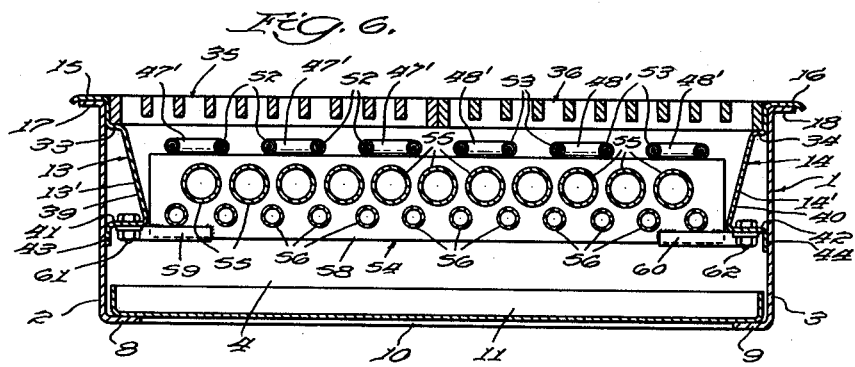
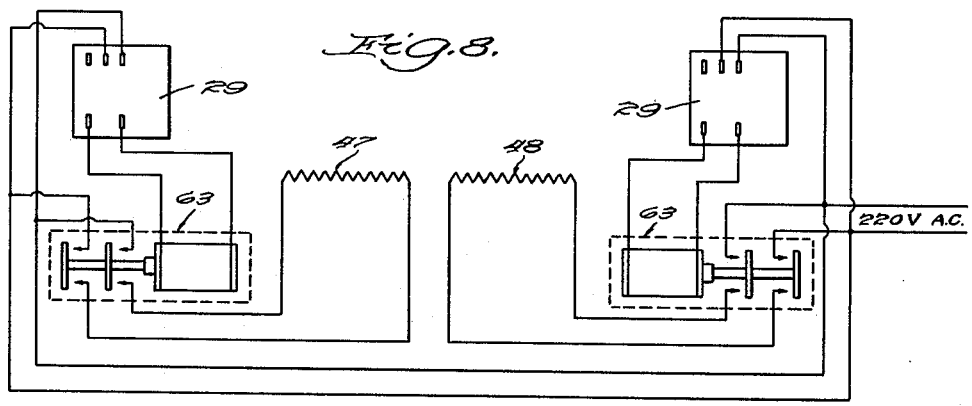
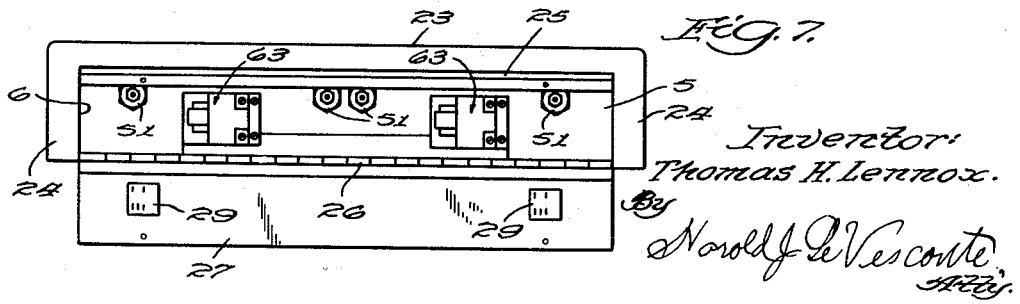
Inventor:
Thomas H. Lennox.

3,166,006
ELECTRIC BROILER
Thomas H. Lennox, 1947 Via Santiago, Corona, Calif.
Filed Oct. 29, 1962, Ser. No. 233,544
2 Claims. (Cl. 99—446)

This invention relates to cooking devices and more particularly to an electrically heated device for broiling and barbecuing meats, fish, and other food susceptible of such cooking.

The principal object of the invention is to provide an electrically heated cooking device for broiling and barbecuing operations characterized by the provision of heat radiating or reflecting means below the heating element effective to cause the emitted heat to be concentrated at the cooking surface.

Another object of the invention is to provide a cooking device of the above character in which the heat radiating means is so constructed and arranged as to cause drippings from meat and the like being cooked to burst into flame and add the heat thus created to the heat developed by the heating means together with the addition of improved flavor characteristics imparted to the food by such flame action.

Still another object of the invention is to provide an electrical cooking device having means for converting at least the major portion of all drippings to flame or steam and ash with the result that the device is more readily kept in a clean and sanitary condition.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a front elevational view of an electrically heated cooking device constituting a first embodiment of the present invention, FIG. 2 is a side elevational view as viewed from the right hand side of FIG. 1, FIG. 3 is a top plan view of the device shown in FIGS. 1 and 2, FIG. 4 is an enlarged top plan view of the device with the grid elements removed to show the arrangement of the heating coils and heat reflector components of the device, FIG. 5 is an enlarged sectional view taken on the line 5—5 of FIG. 1, FIG. 6 is a transverse sectional view taken on the line 6—6 of FIG. 4, FIG. 7 is a front view with the front panel to the electrical control or switch cavity dropped to show the internal structure; the various leads between the electric current control instrumentalities being omitted, and FIG. 8 is a circuit diagram of the electrical system of the device shown in the preceding figures.

Referring to FIGS. 1 through 8 of the drawings, the first illustrated embodiment of the invention comprises a rectangular body structure 1 open at the top and bottom and including spaced parallel side wall members 2 and 3, a rear wall member 4 and a front wall member 5, the latter also forming the rear wall of a suitable compartment or cavity 6 for the electrical control devices and said front wall member 5 also including a forwardly extending horizontal portion at the lower edge thereof which serves as the bottom of said compartment. All of the body members are preferably formed of heavy sheet metal welded together at the junctures to form the body structure. The lower edges of the side wall members 2 and 3 are bent to form inwardly forming flanges 8 and 9, and the lower edge of the rear wall member 4 rests on these flanges and between the flanges is bent to provide a forwardly facing flange portion 10 in the same horizontal plane as the flanges 8 and 9 all of said flanges serving to slidingly support a shallow, drippings receiving pan 11 slidingly received thereon and removable and replaceable through an opening 12 at the front of the frame member below the bend in the front wall member 5 which forms the forwardly projecting portion 7 thereof.

Mounted within the upper end of the body structure is a hollow frame structure upon which the grid means, the heating elements and the heat reflecting assembly are supported. The said hollow frame is made up of side members 13 and 14 having top flanges 15 and 16 overlying the outturned top flanges 17 and 18 on the upper edges of the side members 2 and 3. At their rear ends, the frame side members 13 and 14 are joined by a rear member 19 having an outturned flange 20 overlying the corresponding flange 21 on the top edge of the body rear member 4. The front ends of the frame side members 13 and 14 are joined by a front member 22 having a forwardly extending top flange 23 overlying the outturned flange 23' at the upper edge of the body front member 5; said front frame member flange extending forwardly above the forwardly extending portion 7 of the body front member 5 to form the top wall of the compartment 6. At its forward end, said flange portion 23 extends downwardly in depending leg portions 24, 24 at each side thereof and the lower ends of said leg portions are secured to the forward end of the forwardly extending portion 7 of the body front member 5. Between said leg portions 24, 24, the frame member 22 extends in a shorter downwardly and rearwardly offset short apron portion 25. The front end of the portion 7 of the body front member 5 carries one leaf of a hinge means 26 and the other leaf of said hinge carries a cover 27 which, when closed, is secured to the apron 25 by screws 28, 28. The cover 27 carries a pair of manually operable combined switches and rheostat devices 29, 29 mounted on the rear face thereof and operated by hand knobs 30, 30 at the front face of the cover. The side members 2 and 3 each include forwardly extending portions 31 and 32 which form the respective ends of the cavity 6. The body structure members and the frame structure members are all welded together to form a unitary structure and they have been described as separate members merely for convenience in description.

The inner frame members 13 and 14 include depending skirt portions 13' and 14' spaced inwardly from the inner faces of the side members 2 and 3 and said skirt portions include ledges 33 and 34 for the sides of the grids or grates 35 and 36 here shown as heavy castings of generally rectangular plan configuration and comprising bordering bar portions and spaced longitudinal bars intersected by transverse bars to form a grid work upon which the meat or the like is placed for cooking. The rear frame member 19 and the front frame member 22 are provided with corresponding supporting ledges 37 and 38 for the ends of the grids. Below the ledges 33 and 34, the skirt portions 13' and 14' extend slightly diagonally downwardly and inwardly in runs 39 and 40 for a distance slightly greater than half the height of the adjacent side members and thence extend horizontally in runs 41 and 42 outwardly to the inner faces of the respective side members and terminate in short depending runs 43 and 44 joined to the inner faces of the body members 2 and 3. The rear frame member 19 beyond the ledge 37 formed therein extends downwardly in a run 45 of slightly less length than the runs 39 and 40 and terminates in a forwardly extending horizontal ledge portion 46.

Disposed beneath and extending parallel to the under faces of the grates 36 and 37 are a pair of heating elements 47 and 48 each consisting of a length of metal tubing containing an electrical resistance element imbedded in a non-conductive material such as compacted magnesium oxide and each of said elements having terminal ends extending through and fixed to the front body member 5 into the switch cavity 6 and thence extending through the skirt portion 49 of the front frame member 22 below the ledge 38 thereof. Each end of said heating element includes a collar 50 engaging the rear face of the front frame member skirt portion 49 and the portion thereof extending through the body member 5 is threaded and carries a nut 51 which engages the front face of the body member 5 whereby the heating elements are rigidly mounted in the front wall structure of the apparatus. Between the collars 50, 50 on the ends thereof, the heating element 47 is formed by a series of return bends 47' into six equally laterally spaced parallel forwardly and rearwardly extending runs 52 disposed below and parallel to the under surface of the grate 35 and the element 48 is correspondingly formed by return bends 48' into runs 53 disposed below and parallel to the under surface of the grate 36; all of the heating element runs and the return bends forming said runs lying substantially in a common horizontal plane.

Disposed below the heating elements is a heat reflecting assembly generally indicated at 54. This reflecting assembly comprises a plurality of larger horizontal metal tube elements 55 disposed below the heating elements and extending parallel to the runs 52 and 53 thereof; the tubes being of such size that the spaces between them are less than the diameter of the heating elements and said spaces being disposed directly beneath all of the respective runs of the heating elements except the outermost ones thereof. Spaced below the tubes 55 is a second plurality of smaller tubes 56 extending parallel to the larger tubes and disposed vertically below the respective heating element runs. The ends of the tubes are open and the tubes are held in their above described relation to each other and to the heating elements by rear and front transverse spacer elements 57 and 58 formed of sheet metal and having holes formed therein through which the tubes 55 and 56 extend. The rear end of the reflecting assembly is supported by the engagement of the rear ends of the tubes 55 with the ledge 46 of the rear frame member 19 it being noted that the tubes 56 are slightly shorter than the tubes 55 at the rear end of the reflecting assembly so that they extend below the ledge 46. The spacer members 57 and 58 are of such length that their opposite ends engage the side frame member skirt portions 39 and 40 adjacent the bends therein forming the runs 41 and 42 and thus hold the assembly against sidewise movement. The lower edge of the front spacer member 58 is provided with brackets 59 and 60 at each end thereof which are secured by bolts 61 and 62 to support the front end of the reflecting assembly. It is to be noted that this reflecting assembly can be quickly removed from the apparatus by the removal of the nuts from the bolts 61 and 62.

The function of the reflecting assembly is to reflect the heat given off by the lower side of the heating elements and to cause the reflected heat to be applied to heating the grates and the food being cooked thereon. Each successive radiating surface downwardly from the surface closest to the heating element receives a portion of the heat from the radiating surface above it and reflects a portion of the received heat back to the radiating surface from which it was received. The result is that practically all of the heat developed by the heating elements is directed toward the grates and the food thereon. Also, this radiator assembly being placed close to the heating elements develops sufficient heat to cause at least some of the fat or juice dripping from the food as it is cooked to flash into flame or steam instantly thereby achieving the flame characteristics of charcoal broilers which impart the so-called "charcoal broil" taste to the food. Moreover, since practically all of the heat generated by the heating elements is thus employed in cooking the food, less current is required for a given cooking operation than would be the case if a reflector of this character were not used. Still further, because of the capacity of the reflector to immediately cause fat or grease to burst into flame and any non-combustible juice to be converted into steam, the mineral components of such drippings are, of course, converted into an ash which is readily removed from the reflecting assembly, wherefore, this portion of the apparatus is, in effect, substantially self-cleaning.

Referring to FIG. 8, there is shown a circuit which is satisfactory for use in the disclosed embodiment of the invention. In this circuit diagram, the circuits are identical for each heating element wherefore, a description of one will serve for both.

Each circuit employs a manually operable switch 29 operated by its hand knob 30 and a normally open relay 63 controlled by the switch to open and close the circuit which includes the associated heating element. The switch here employed is a standard catalog item manufactured by Robertshaw-Fulton Controls Co., identified as No. 1NF-240-74B and the relay is a catalog item manufactured by Arrow-Hart & Hegeman Electric Co., identified as No. 32222-L-U.

Assuming that the switch is in open position, the first effect of rotation of the hand knob 30 is to close the switch with incident closing of the relay and supply of current to the associated heating element. The switch includes a resistance element which heats a bimetallic component to a point causing the switch 29 to open with resultant opening of the relay. When the bimetallic element of the switch cools off to a predetermined degree, the switch 29 closes to effect supply of current to the heating element. Adjustment by rotation of the hand knob 30 varies the bias opposing the opening of the switch 29 by the bimetallic element with resultant variation of the relative intervals of current supply and nonsupply to the heating element and consequent variation of the cooking heat output of the heating element. Any other equivalent circuitry may, of course, be employed so long as the result is a variable control of the cooking heat and, likewise, the control units may be other than those specifically identified by way of example.

While in the foregoing specification there has been disclosed certain presently preferred embodiments of the invention, it is not to be inferred therefrom that the invention is thus limited to the specific details of construction thus disclosed and it will be understood that the invention includes as well all such changes and modifications in the parts, and in the construction, combination and arrangement of parts as shall come within the purview of the appended claims.

I claim:

1. In an electrical broiler, a hollow rectangular body open at the top and bottom and including front, back and side wall portions, a hollow rectangular frame structure disposed within said body and supported by engagement with the upper edge of said body; said frame structure including wall portions disposed within and spaced from the wall portions of said body, a cooking grid means supported by said frame structure and covering the entire area bounded thereby, a cooking heat supplying means comprising at least one electrical resistance heating element supported by said body and said frame structure and disposed in parallel spaced relation below said grid means, and a heat reflecting means carried by said frame structure and disposed below said heat supplying means and in parallel relation to a horizontal plane containing said heat supplying means; said heat reflecting means comprising a first plurality of parallel tubes occupying a first plane parallel to and disposed below a horizontal plane containing said heat supplying means, a second plurality of tubes extending parallel to each other and to the tubes of said first plurality and disposed in a plane below and parallel to the plane containing said first plurality of tubes, and means holding the tubes of both of said pluralities in the said parallel, spaced relation; certain ones of said second plurality of tubes being disposed one each beneath each of the spaces defined by adjacent ones of said first plurality of tubes; said heat reflecting means comprising a plurality of laterally and vertically spaced, parallel, horizontal elements constituting a substantially uninterrupted heat reflecting area substantially equal to the area of said cooking grid means; the spaces between said parallel elements affording tortuous passages through which drippings may escape.

2. In an electrical broiler, a grid means forming a top surface for said broiler, electrical resistance cooking heat supply means disposed parallel to and spaced vertically below said grid means and effective to supply heat substantially uniformly to the entire area of said grid means, heat reflecting means disposed below said heat supply means in a plane parallel to the plane of said grid means and comprising a plurality of laterally and vertically spaced, parallel elements constituting a substantially uninterrupted heat reflecting area substantially equal in area to the area of said grid means; the spaces between said parallel elements affording tortuous passages through which drippings may escape, and a supporting structure on which said grid means, said heat supplying means, and said heat reflecting means are supported as a removable unit in said spaced parallel relation to each other; said heat reflecting means comprising a first plurality of parallel tubes occupying a first plane parallel to and disposed below a horizontal plane containing said heat supplying means, a second plurality of tubes extending parallel to each other and disposed in a plane below and parallel to the plane containing said first plurality of tubes, and means holding the tubes of both of said pluralities in said respective spaced parallel relations; certain ones of said second plurality of tubes being disposed one each vertically below the spaces defined by adjacent ones of said first plurality of tubes.

References Cited by the Examiner
UNITED STATES PATENTS

| | | | |
|---|---|---|---|
| 2,812,706 | 11/57 | Del Francia et al. | 219—443 X |
| 2,856,502 | 10/58 | Wolf | 219—443 |
| 3,095,495 | 6/63 | Gvozdjak et al. | 219—538 |

RICHARD M. WOOD, *Primary Examiner.*